G. F. BALLOU & C. V. WOERD, Jr.
CLOTHES-SPRINKLER.
No. 178,096. Patented May 30, 1876.
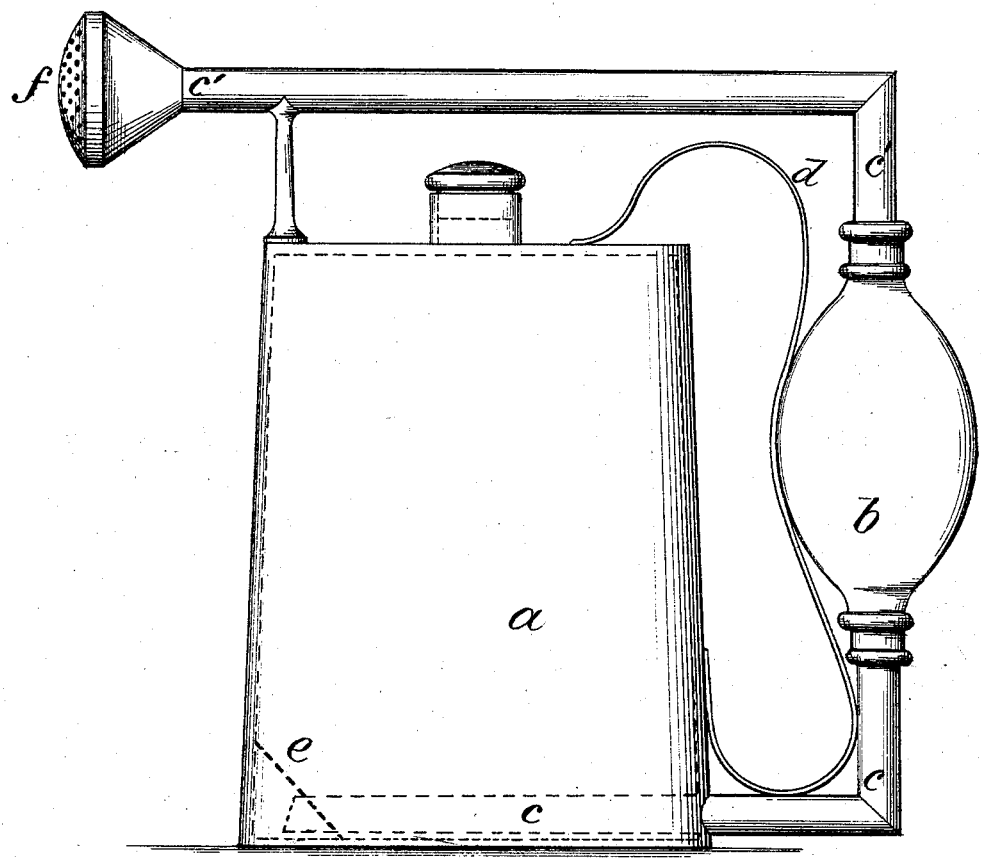
Witnesses.
M. Wilde
E. A. Marsh
Inventors.
George F. Ballou.
Charles V. Woerd Jr.

UNITED STATES PATENT OFFICE.

GEORGE F. BALLOU, OF BOSTON, AND CHARLES V. WOERD, JR., OF WALTHAM, MASSACHUSETTS.

IMPROVEMENT IN CLOTHES-SPRINKLERS.

Specification forming part of Letters Patent No. 178,096, dated May 30, 1876; application filed April 3, 1876.

*To all whom it may concern:*

Be it known that we, GEORGE F. BALLOU, of Boston, in the county of Suffolk and State of Massachusetts, and CHARLES V. WOERD, Jr., of Waltham, in the county of Middlesex and State of Massachusetts, have invented a new and useful Improvement in Watering-Pots and Clothes-Sprinklers, which improvement is fully set forth in the following specification, reference being had to the accompanying drawing.

The object of our invention is to produce a watering-pot, combined with an apparatus for sprinkling clothes, plants, windows, and for various other purposes; and our invention consists in a can or pot, $a$, the handle $d$ of which is formed of a pump, consisting of an elastic bulb or ball, $b$, with suction and force valves, and two inflexible tubes, $c\ c'$, the one, $c$, passing to the lower portion of pot, and through its side, to a point diametrically opposite to its place of entering, where the inlet is protected by a fine wire-gauze, $e$, from dust and impurities. The other inflexible tube, $c'$, passes over and above the top of the can, either in a straight line or in a suitable curve, and has attached to the outlet a fine spray or sprinkler, $f$. The pump may be firmly attached across the top of can instead of at the side, as shown in the drawing.

The pot $a$ being filled with water, in taking hold of the handle, a gentle pressure to the bulb $b$ will set the pump in operation, and a fine spray be thrown on the objects to be watered. By releasing the pressure the flow of water will be instantaneously stopped, thus avoiding all dripping and soiling of the floor.

The arrangement of the tube $c$ inside the pot $a$ secures always a supply of water as long as there is any in the pot, as, either by an upright or tipping position of the pot $a$, the tube $c$ reaches to the lowest portion of the same, and thus all the water may be drawn and ejected by the pump.

Thus a substantial and light watering-pot is produced, which can be easily carried about and quickly applied, without requiring a separate vessel or long and flexible tubing.

For sprinkling clothes, the work will be performed with cleanliness and nicety, and the spray be always kept under easy control of the operator.

We claim as our invention—

The combination of the watering pot or can $a$ with a handle, formed by an elastic bulb, $b$, valve-boxes, and inflexible tubes $c\ c'$, with wire-gauze $e$ and sprinkler $f$, substantially as above specified.

GEORGE F. BALLOU.
CHARLES V. WOERD, JR.

Witnesses:
M. WILDE,
E. A. MARSH.